United States Patent [19]
Johns

[11] 3,790,218
[45] Feb. 5, 1974

[54] DUAL WHEEL MOUNTING DEVICE

[76] Inventor: Reed L. Johns, 6733 South 2345 East, Holladay, Utah 84117

[22] Filed: Apr. 6, 1972

[21] Appl. No.: 241,616

[52] U.S. Cl. ............................................. 301/36 R
[51] Int. Cl. .............................................. B60b 11/00
[58] Field of Search..... 301/36 R, 36 WP, 38 R, 47; 152/376

[56] References Cited
UNITED STATES PATENTS

| | | | |
|---|---|---|---|
| 1,948,136 | 2/1934 | Scheckler | 301/36 R |
| 2,067,620 | 1/1937 | Johnston | 301/36 R |
| 2,635,012 | 4/1953 | Rappaport | 301/36 R |
| 2,714,042 | 7/1955 | Kelly | 301/47 |
| 3,039,825 | 6/1962 | Clark | 301/36 R |
| 3,139,309 | 6/1964 | Breton | 301/36 WP |
| 3,532,384 | 10/1970 | Williams | 301/36 R |

FOREIGN PATENTS OR APPLICATIONS

| | | | |
|---|---|---|---|
| 303,947 | 1/1929 | Great Britain | 301/9 SB |

Primary Examiner—Richard J. Johnson
Assistant Examiner—Reinhard J. Eisenzopf
Attorney, Agent, or Firm—Lynn G. Foster

[57] ABSTRACT

A device for mounting dual wheels, said device comprising a generally cylindrical member with radially projecting flanged portions at each end thereof, a plurality of apertures extending through the flanged portion at one end of said cylindrical member and positioned to receive the wheel mounting studs of a vehicle hub, and a plurality of externally threaded shafts projecting outwardly from the flanged portion at the opposite end of said cylindrical member extending parallel to the axis of said cylindrical member and positioned to mate with the mounting apertures of a vehicle wheel. Several forms of the invention are disclosed.

4 Claims, 7 Drawing Figures

PATENTED FEB 5 1974

DUAL WHEEL MOUNTING DEVICE

BACKGROUND

1. Field of Invention

This invention relates to automotive vehicles and is particularly directed to means for mounting dual wheels on single wheel vehicles, such as pickup trucks, dune buggies and the like.

Automotive vehicles, such as pickup trucks, dune buggies, and the like, are frequently driven over construction sites, fields, beaches, and other off-road areas where the surface may be inadequate to support the vehicle or may provide poor traction. When this occurs, the vehicle may become stuck and it may be necessary to employ a winch or tractor to extract the vehicle or, in mud, for example, to simply abandon the vehicle until the surface conditions improve. Obviously, such occurrences create considerable annoyance, and much time, effort and expense may be required to extract the vehicle. Moreover, for commercial operators, such as contractors and farmers, such occurrences may seriously interfere with the continuance of their activities.

PRIOR ART

It is well known that dual wheels improve the traction and load bearing characteristics of a vehicle. However, fortunately or unfortunately, such occurrences are not overly common and are often seasonal. Moreover, a large percentage of such vehicles are not subjected to off-road conditions and the provision of dual wheels would significantly increase the cost of such vehicles. Thus, it has been the practice, heretofore, to build such vehicles with single wheels and to rely upon special tires, accessories, such as chains, and techniques, such as partially deflating the tires, to prevent such vehicles from becoming stuck.

BRIEF SUMMARY AND OBJECTS OF INVENTION

It will be apparent that the use of special tires, chains, and the like, would be of even greater value if used on dual wheels. Moreover, for pickup trucks and the like, dual wheels provide an additional advantage in increasing the load carrying ability of the vehicle. On the other hand, the provision of dual wheels significantly increases the tire cost and maintenance for the operator. Thus, it would be desirable to provide means whereby dual wheels could be mounted, when needed, and could readily be dismounted, when they were not needed. Several devices have been proposed, previously, for accomplishing this. However, none of the prior art devices have been entirely satisfactory. Some of the prior art devices have been extremely difficult to mount and dismount. Others have required the use of special tools or equipment. Still other prior art devices have required substantial and expensive modification of the existing structure.

These disadvantages of the prior art are overcome with the present invention and a dual wheel attaching device is provided which can be quickly and easily mounted on or dismounted from existing structure without modification thereof and without requiring the use of special tools or equipment.

The advantages of the present invention are preferably attained by providing a dual wheel attaching device comprising: a cylindrical member formed with radially projecting flanged portions at each end thereof; a plurality of apertures extending through the flanged portion at one end of said cylindrical member, said apertures being positioned to wheel the whel mounting studs of a vehicle; and a plurality of externally threaded shafts projecting outwardly from the flanged portion at the opposite end of said cylindrical member extending parallel to the axis of said cylindrical member and spaced to mate with the mounting apertures in a vehicle wheel. Preferably, the externally threaded shafts are rotationally offset about the axis of said cylindrical member from the apertures in the flanged portion at the opposite end of the cylindrical member. Moreover, if desired, one or more rim-engaging braces may be provided on the exterior of the cylindrical member to enhance load sharing between the adjacent wheels.

Accordingly, it is an object of the present invention to provide improved means for mounting dual wheels.

Another object of the present invention is to provide means for quickly and easily mounting and dismounting dual wheels.

A further object of the present invention is to provide means for mounting and dismounting dual wheels without requiring the use of special tools or equipment.

A specific object of the present invention is to provide a device for mounting dual wheels, said device comprising a cylindrical member formed with radially projecting flanged portions at each end thereof; a plurality of apertures extending through the flanged portion at one end of said cylindrical member, said apertures being positioned to receive the wheel mounting studs of a vehicle; and a plurality of externally threaded shafts projecting outwardly from the flanged portion at the opposite end of said cylindrical member extending parallel to the axis of said cylindrical member and spaced to mate with the mounting apertures in a vehicle wheel.

These and other objects and features of the present invention will be apparent from the following detailed description, taken with reference to the accompanying drawings.

DETAILED DESCRIPTION OF ILLUSTRATED EMBODIMENT

Figure 1:
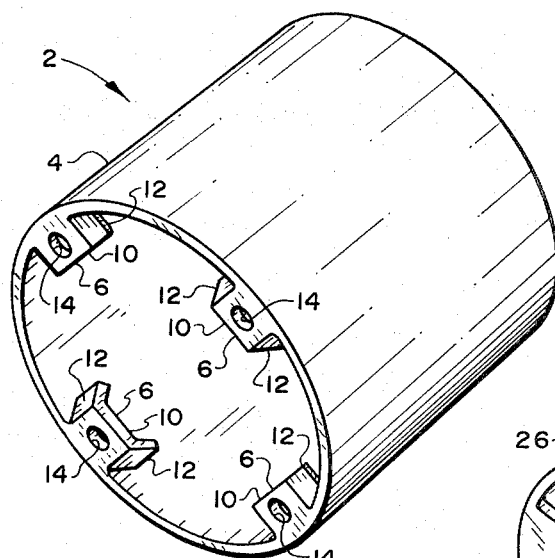
FIG. 1 is an isometric view of a dual wheel mounting device embodying the present invention.
Figure 2:
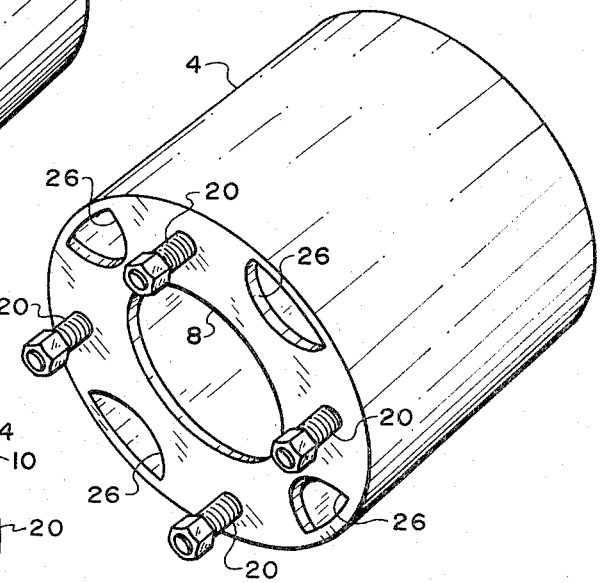
FIG. 2 is an isometric rear view of the device of FIG. 1.
Figure 3:
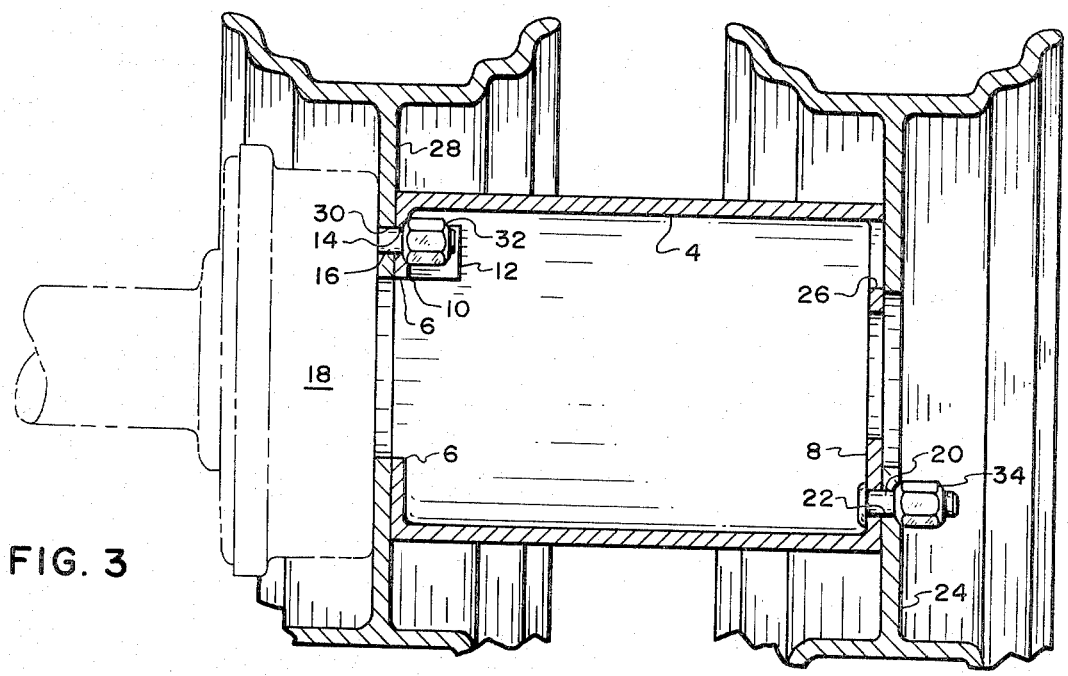
FIG. 3 is a view, partly in section showing the device of FIG. 1 mounted on a vehicle.

In that form of the present invention chosen for purposes of illustration in FIGS. 1-4, a dual wheel mounting device is shown, indicated generally at 2, comprising a generally cylindrical member 4 having radially projecting, flanged end portions 6 and 8. As shown, the flanged end portion 6 is formed of a plurality of arc segments 10 spaced equally about the periphery of the cylindrical member 4 and each provided with wings 12 extending rearwardly from opposite edges of the segments 10 in engagement with the interior surface of the cylindrical member 4. Each of the segments 10 has an aperture 14 extending therethrough dimensioned to receive the wheel mounting studs 16 of a vehicle hub 18, as seen in FIG. 3. It will be understood that the number of segments 10 provided and the spacing thereof will be determined by the number and spacing of the wheel mounting studs 16 of the vehicle hub 18.

Figure 4:
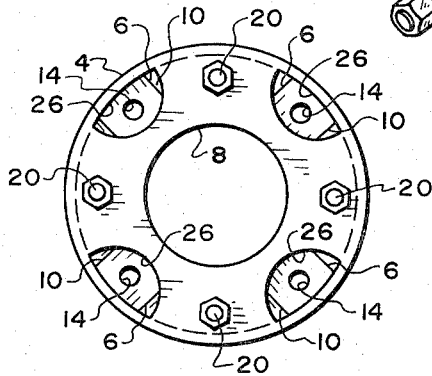
FIG. 4 is an end elevation of the assembly of FIG. 3.

At the opposite end of the cylindrical member 4, the flanged portion 8 carries a plurality of externally threaded shafts 20 which project outwardly from the flanged portion 8 substantially parallel to the axis of the cylindrical member 4 and spaced equally thereabout to mate with the mounting apertures 22 of a vehicle wheel 24, as seen in FIG. 3. Obviously, the number and spacing of the shafts 20 will be determined by the number and spacing of the mounting apertures 22 in the wheel 24 and will preferably, although not necessarily, be equal to the number of the apertures in the flanged portion 6 of the device 2. As seen in FIGS. 2 and 4, the shafts 20 on flanged portion 8 are preferably rotationally offset about the axis of the cylindrical member 4 from the apertures 14 of the flanged portion 6 and openings 26 are formed in the flanged portion 8 in substantial alignment with the apertures 14 of flanged portion 6.

To mount dual wheels on the vehicle hub 18, using the device 2, a first wheel 28 is mounted inserting the wheel mounting studs 16 of the vehicle hub 18 through the mounting apertures 30 of the first wheel 28, in a conventional manner. Next, the wheel mounting studs 16 of the vehicle hub 18 are inserted through the apertures 14 of the flanged portion 6 of the device 2. Thereafter, wheel nuts 32 are threaded onto the studs 16, in a conventional manner, and are tightened to secure the first wheel 28 and the device 2 to the vehicle hub 18. In order to accomplish this, a wrench may conveniently be passed through the openings 26 in the flanged portion 8 of the device 2. Next, the outer wheel 24 is mounted by inserting the shafts 20 of flanged portion 8 of the device 2 through the mounting apertures 22 of the wheel 24 and wheel nuts 34 are threaded onto the shafts 20 and tightened to secure the wheel 24.

Figure 5:
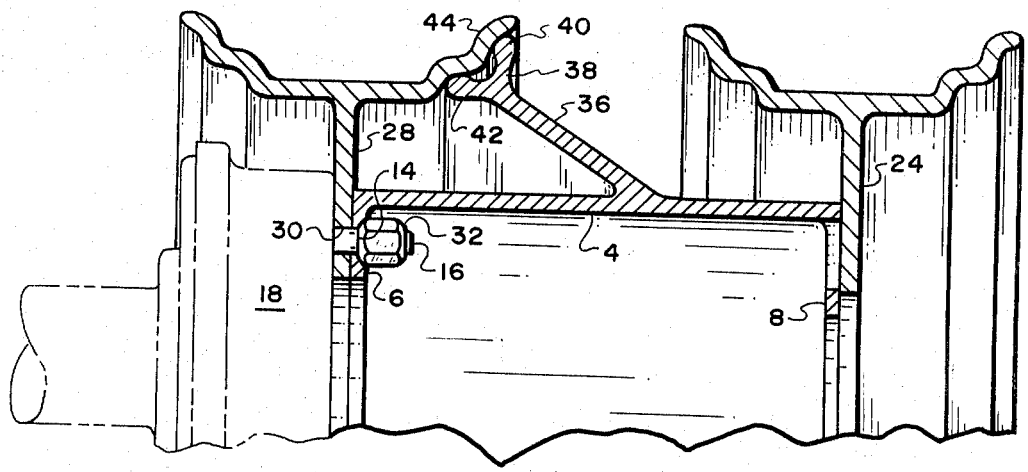
FIG. 5 is a view, similar to that of FIG. 3, showing a modified form of the device of FIG. 1.

FIG. 5 shows a modified form of the device 2 having a brace 36 secured to the exterior of the cylindrical member 4 and extending outward therefrom to a bifurcated end 38 having projections 40 and 42 formed to engage the rim 44 of the inner wheel 28 to facilitate load distribution between the inner wheel 28 and the outer wheel 24. Preferably, a plurality of braces, identical to brace 36, are provided, spaced equidistantly about the periphery of the cylindrical member 4. Alternatively, the brace may be an annular member, secured about the entire periphery of the cylindrical member 4, and having a cross-sectional configuration corresponding to the brace 36.

Figure 6:
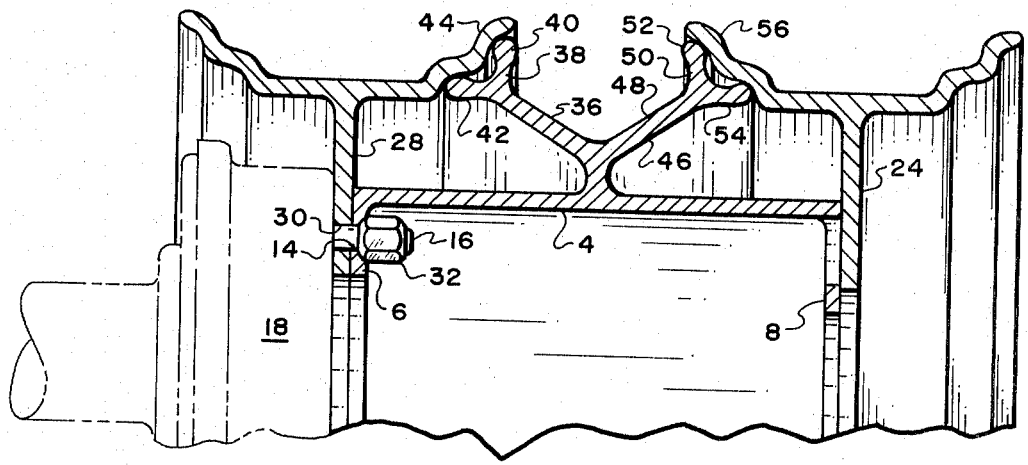
FIG. 6 is a view, similar to that of FIG. 4, showing a further modified form of the device of FIG. 1.

FIG. 6 shows a further modified form of the device 2 wherein a second brace 46 has one end 48 secured approximately at the midpoint of the brace 36 and extends arcuately outward to a bifurcated end 50 having projections 52 and 54 formed to engage the rim 56 of the outer wheel 24. A plurality of braces, identical to brace 46 may be provided, spaced equidistantly about the periphery of the cylindrical member 4 or, alternatively, the brace may be an annular member extending about the entire periphery of the cylindrical member 4 and having a cross-sectional configuration corresponding to the brace 46.

Figure 7:
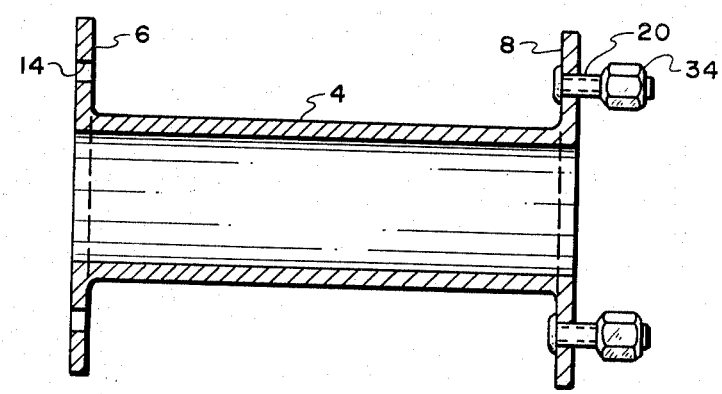
FIG. 7 is an isometric view of an additional modified form of the device of FIG. 1.

FIG. 7 shows a further modified form of the device 2 wherein the diameter of the cylindrical member 4 is less than that of the wheel mounting studs 16 of the vehicle hub 18 and the flanged end portions 6 and 8 project radially outward from the cylindrical member 4. In this form of the invention, the cylindrical member 4 may be solid. However, in use, this form of the invention is identical with that of FIG. 1.

Obviously, numerous other variations and modifications may be made without departing from the present invention. Accordingly, it should be clearly understood that the forms of the present invention described above and shown in the accompanying drawings are illustrative only and are not intended to limit the scope of the invention.

What is claimed is:

1. A device for converting a vehicle from single wheel support to dual wheel support, said device comprising:
    a hollow cylindrical thin wall member formed with radially directed flange means at each end of the cylindrical member;
    a plurality of apertures extending through the flange means at one end of the cylindrical member, and sized, shaped and arranged to receive the wheel mounting studs of a vehicle hub comprising the original single wheel support such that said flange means become interposed between the hub and the lug nuts when secured to the studs, said apertures being equally radially spaced from the axis of the cylindrical member;
    a plurality of externally threaded shafts projecting parallel to the axis of the cylindrical member outwardly from the other radially directed flange means at the opposite end of the cylindrical member, the shafts being equally radially spaced from the axis of the cylindrical member a distance substantially the same as the first-mentioned radial distance to the studs to match with the mounting apertures of a second like vehicle wheel;
    said shafts being angularly offset in respect to the studs;
    a plurality of access openings in the other flange means each opening being in direct axial and angular alignment with one of said studs whereby the lug nuts may be removed by a linear tool.

2. A device for mounting dual wheels, said device comprising:
    a cylindrical member formed with radially projecting flanged portions at each end thereof,
    a plurality of apertures extending through the flanged portion at one end of said cylindrical member and positioned to receive the wheel mounting studs of a vehicle hub,
    a plurality of externally threaded shafts projecting outwardly from the flanged portion at the opposite end of said cylindrical member extending parallel to the axis of said cylindrical member and positioned to mate with the mounting apertures of a vehicle wheel,
    a first brace secured to the exterior surface of said cylindrical member and extending arcuately outward therefrom to a bifurcated end having projections formed to engage the rim of a vehicle wheel.

3. The device of claim 2 further comprising:

a second brace secured to approximately the midpoint of said first brace and extending arcuately outward therefrom to a bifurcated end having projections formed to engage the rim of a vehicle wheel.

4. The device of claim 3 wherein:

said second brace extends in a direction generally opposite to that of said first brace whereby the bifurcated end of said first brace will engage the rim of a vehicle wheel mounted adjacent one end of said cylindrical member and the bifurcated end of said second brace will engage the rim of a vehicle wheel mounted adjacent the opposite end of said cylindrical member.

* * * * *